Figure 1:
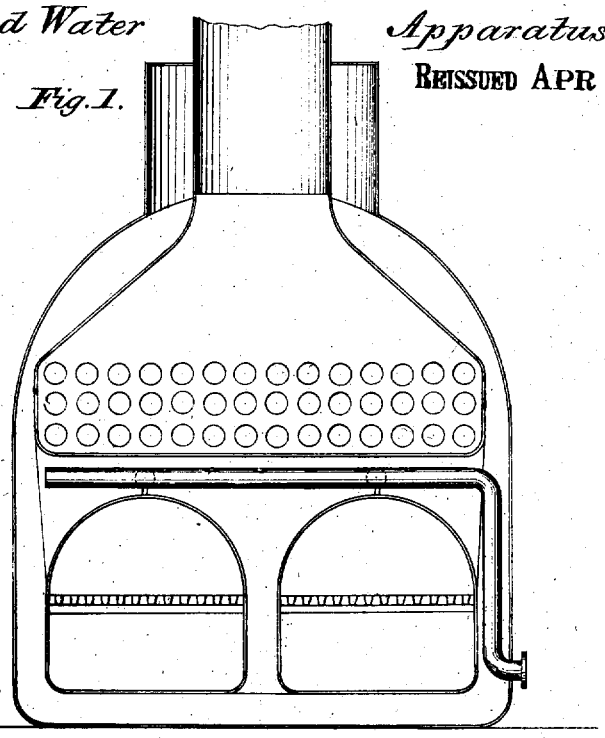
Figure 2:
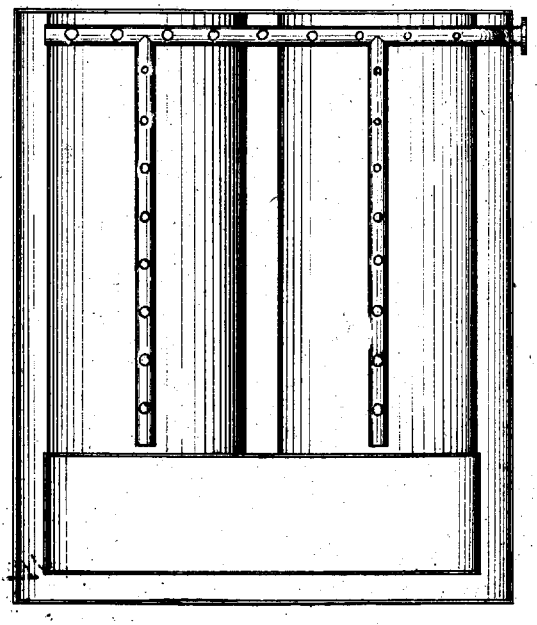
Figure 3:
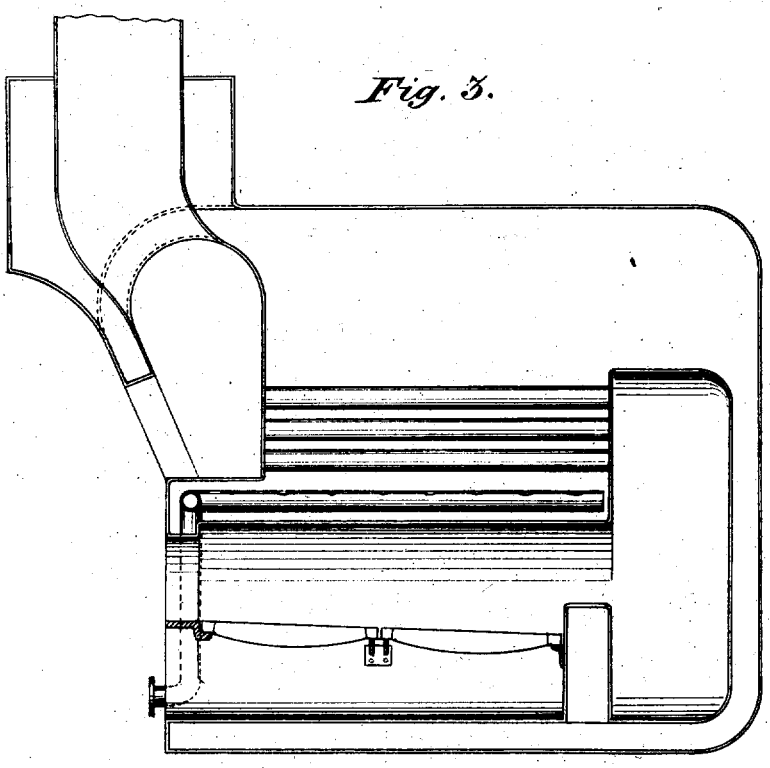

Sheet 1.

John DOYLE.

Ass'r. to himself and Anthony Reybold.

Feed Water Apparatus.

REISSUED APR 18 1871

4345

Witnesses:

F. Dumeze

Geo. P. Fisher

Inventor:

John Doyle by Chas. G. Fisher

Attorney

Sheet 2. 2 Sheets

John DOYLE.

No. 4,345 Reissued Apr. 18. 1871.

Ass'r. to himself and Anthony Reybold.

Feed Water Apparatus.

Witnesses:

F. Daimse

Geo. P. Fisher

Inventor:

John Doyle by Chas. G. Fisher

Attorney.

United States Patent Office.

JOHN DOYLE, OF BALTIMORE, MARYLAND, ASSIGNOR TO HIMSELF AND ANTHONY REYBOLD, OF DELAWARE CITY, DELAWARE.

Letters Patent No. 110,753, dated January 3, 1871; reissue No. 4,345, dated April 18, 1871.

Division A.

IMPROVEMENT IN FEED-WATER PIPES.

The Schedule referred to in these Letters Patent and making part of the same.

I, JOHN DOYLE, of Baltimore, in the county of Baltimore and State of Maryland, have invented an Improvement in Feed-water Apparatus, of which the following is a specification.

The nature of my invention consists of a feed-water pipe in the interior of a steam-boiler having a series of graduated perforations, the smallest being nearest the feed check-valve and the largest being at or in the extremity of said feed-water pipe.

The object of my invention is to equalize the expansion and contraction of the boiler by distributing the feed-water in all parts equally and simultaneously, and to prevent foaming.

The accompanying drawing represents the apparatus as placed in the boiler.

*v* represents the feed check-valve.

*p p* represent the feed-pipes in the boiler.

*e e*, the graduated perforations.

The feed-water passes through the feed check-valve into the feed-pipes *p p* and out of the graduated perforations *e e*, and is distributed throughout the water-space of the boiler in equal jets or streams.

What I claim is—

A feed-water pipe within a steam-boiler with graduated perforations to equalize the distribution of the feed-water in the boiler, substantially as and for the purpose described.

In testimony whereof I have signed my name to this specification in the presence of two subscribing witnesses.

JOHN DOYLE.

Witnesses:

CHAS. G. FISHER,

HARRY WHEELER.